(12) United States Patent
Bo

(10) Patent No.: US 9,943,997 B2
(45) Date of Patent: Apr. 17, 2018

(54) RECYCLED PLASTIC COMPOSITE COMPOSITION

(71) Applicant: ATT Southern, Inc., Camp Hill, PA (US)

(72) Inventor: Yu Bo, Huizhou (CN)

(73) Assignee: ATT Southern, Inc., Camp Hill, PA (US)

( * ) Notice: Subject to any disclaimer, the term of this patent is extended or adjusted under 35 U.S.C. 154(b) by 0 days.

(21) Appl. No.: 15/180,835

(22) Filed: Jun. 13, 2016

(65) Prior Publication Data

US 2016/0289417 A1    Oct. 6, 2016

Related U.S. Application Data

(63) Continuation of application No. 13/784,931, filed on Mar. 5, 2013, now abandoned.

(30) Foreign Application Priority Data

Mar. 5, 2012  (CN) .......................... 2012 1 0055616
Mar. 5, 2012  (CN) .......................... 2012 1 0055620

(51) Int. Cl.
| | |
|---|---|
| *C08K 3/26* | (2006.01) |
| *B29C 43/00* | (2006.01) |
| *C08J 11/04* | (2006.01) |
| *A01G 9/02* | (2018.01) |
| *B29B 17/00* | (2006.01) |
| *C08K 3/34* | (2006.01) |
| *A47G 1/06* | (2006.01) |
| *B29B 7/38* | (2006.01) |
| *B29C 43/02* | (2006.01) |
| *B29C 43/50* | (2006.01) |
| *B29C 43/52* | (2006.01) |
| *B29C 70/64* | (2006.01) |
| *B29C 71/02* | (2006.01) |
| *B29K 23/00* | (2006.01) |
| *B29K 105/00* | (2006.01) |
| *B29K 105/16* | (2006.01) |
| *B29K 105/26* | (2006.01) |
| *B29K 509/00* | (2006.01) |
| *B29L 31/00* | (2006.01) |

(52) U.S. Cl.
CPC .............. *B29C 43/003* (2013.01); *A01G 9/02* (2013.01); *A01G 9/021* (2013.01); *A47G 1/0605* (2013.01); *B29B 7/38* (2013.01); *B29B 17/00* (2013.01); *B29C 43/02* (2013.01); *B29C 43/50* (2013.01); *B29C 43/52* (2013.01); *B29C 70/64* (2013.01); *B29C 71/02* (2013.01); *C08J 11/04* (2013.01); *C08K 3/26* (2013.01); *C08K 3/34* (2013.01); *C08K 3/346* (2013.01); *B29K 2023/083* (2013.01); *B29K 2105/0067* (2013.01); *B29K 2105/16* (2013.01); *B29K 2105/26* (2013.01); *B29K 2509/00* (2013.01); *B29K 2995/0012* (2013.01); *B29L 2031/7136* (2013.01); *C08K 2003/265* (2013.01)

(58) Field of Classification Search
CPC ...... C08K 3/26; C08K 3/34; C08K 2003/265; A01G 9/021; A47G 1/0605
USPC ........................................................ 524/425
See application file for complete search history.

(56) References Cited

U.S. PATENT DOCUMENTS

| | | | |
|---|---|---|---|
| 3,673,289 A | 6/1972 | Gagliani | |
| 5,212,223 A * | 5/1993 | Mack .......................... | C08J 9/08 521/143 |
| 5,288,450 A | 2/1994 | Koizumi et al. | |
| 5,498,667 A | 3/1996 | David et al. | |
| 5,566,889 A | 10/1996 | Preiss | |
| 5,693,283 A | 12/1997 | Fehn | |
| 5,788,901 A | 8/1998 | Barnard | |
| 6,217,804 B1 | 4/2001 | Lieberman | |
| 6,306,318 B1 | 10/2001 | Ricciardelli et al. | |
| 2003/0075824 A1 | 4/2003 | Moore et al. | |
| 2007/0212531 A1 * | 9/2007 | McIntyre ............ | B29B 17/0042 428/297.4 |
| 2007/0299179 A1 * | 12/2007 | Tham ...................... | B29B 17/02 524/300 |
| 2010/0210775 A1 * | 8/2010 | Stack .................... | C08K 3/0008 524/420 |

FOREIGN PATENT DOCUMENTS

| | | | |
|---|---|---|---|
| CN | 101134563 A | | 3/2008 |
| CN | 101177587 A | | 5/2008 |
| CN | 101922223 A | * | 12/2010 |
| CN | 102070807 A | | 5/2011 |
| CN | 102070856 A | | 5/2011 |

OTHER PUBLICATIONS

Translation of CN101922223, Dec. 22, 2010.*
Difference Between Injection Molding and Extrusion, 2011.

* cited by examiner

*Primary Examiner* — Hui Chin
(74) *Attorney, Agent, or Firm* — Brooks Kushman P.C.

(57) ABSTRACT

A formulation for a recycled plastic composite composition, and a method of making the composite composition, is provided. The composite composition includes recycled EVA plastic from 30% to 80%, a stone powder from 20% to 70%; percentages by weight.

8 Claims, No Drawings

RECYCLED PLASTIC COMPOSITE COMPOSITION

CROSS REFERENCE TO RELATED APPLICATION

This application is a continuation of U.S. patent application Ser. No. 13/784,931 filed Mar. 5, 2013, which claims priority under 35 U.S.C. § 119(e) to Chinese Patent Application Nos. CN201210055616.X, filed Mar. 5, 2012, and CN201210055620.6, filed Mar. 5, 2012, which applications are hereby incorporated by reference in their entirety.

BACKGROUND OF THE INVENTION

Field of the Invention

The present invention relates to a resin article, particularly to a composite formulation for a recycled EVA (ethylene-vinyl acetate copolymer), a recycled PP (chlorinated polypropylene), a recycled PVC (polyvinyl chloride), and a recycled PE (polyethylene), as well as to a process for the heat-pressing of a recycled plastic composite.

Background Information

Currently the problem in the resin article and the related art is the high cost of the raw material, the blank will be modified by the repairing, low production efficiency, the repeated usage of the corresponding mold being limited (about 300 times), and the lower surface smoothness, heat resistance, and toughness of the resin article.

SUMMARY OF THE INVENTION

The present invention provides a formulation for a recycled plastic composite comprising in the terms of weight percent: recycled EVA plastic from 30% to 80%, a stone powder from 20% to 70%. Preferably, said formulation comprises in the terms of weight percent: the recycled EVA plastic greater than 70% and less than or equal to 80%, the stone powder greater than or equal to 20% and less than 30%. The recycled plastic comprises a recycled EVA (ethylene-vinyl acetate copolymer), a recycled PP (chlorinated polypropylene), a recycled PVC (polyvinyl chloride), and a recycled PE (polyethylene). The formulation for the recycled plastic composite of the present invention can improve the toughness, strength, surface smoothness, heat resistance, and electroplating performance of various products obtained, can be pressed through hydraulic press, results in the increased production, lowered labor, cost for producing various products and decreased pollution.

The present invention further provides a process for the heat-pressing of a recycled plastic composite comprising sufficiently mixing the pellet of the recycled plastic and the heavy calcium carbonate according to the formulations to get the composite, the composite is fed to a screw melting machine with electric heating, heated and further mixed, the thick composite after being heated is conveyed to the outlet by the screw; the thick composite is obtained at the outlet, conveyed to the steel mold of the hydraulic press according to the volume of the mold to be molded and pressed strong; said thick composite is cooled in the steel mold for 5 minute to 15 minute with the recirculation of the cooling water to de-mold the thick composite, and the thick composite is completely immersed in the water to be cooled completely to finish the heat-pressing of the composite. The process of heat-pressing the composite of the present invention can improve production efficiency, the surface smoothness, the toughness of the product, the saving of the raw material, improving the heat resistance from −40° C. to −80° C., improve the electroplating performance of various products obtained, results in the decreased pollution.

More specifically, the present invention provides a formulation for the recycled plastic composite which can improve the toughness, strength, surface smoothness, heat resistance, and electroplating performance of various products obtained, results in the increased production, lowered labor, cost for producing various products and decreased pollution. In order to achieve the subject of the present invention, there is provided the following embodiments: a formulation for a recycled plastic composite comprising in the terms of weight percent: a recycled plastic from 30% to 80%, a heavy calcium carbonate from 20% to 70%.

Preferably, the recycled plastic is one or mixture of more in any ratio of a recycled EVA (ethylene-vinyl acetate copolymer), a recycled PP (chlorinate polypropylene), a recycled PVC (polyvinyl chloride), and a recycled PE (polyethylene). In one embodiment, said formulation comprises in the terms of weight percent: the recycled plastic greater than 70% and less than or equal to 80%, the heavy calcium carbonate greater than or equal to 20% and less than 30%. In one embodiment, said formulation comprises in the terms of weight percent: the recycled plastic greater than 60% and less than or equal to 70%, the heavy calcium carbonate greater than or equal to 30% and than 40%. In one embodiment, said formulation comprises in the terms of weight percent: the recycled plastic greater than 50% and less than or equal to 60%, the heavy calcium carbonate greater than or equal to 40% and less than 50%. In one embodiment, said formulation comprises in the terms of weight percent: the recycled plastic greater than 40% and less than or equal to 50%, the heavy calcium carbonate greater than or equal to 50% and less than 60%. In one embodiment, said formulation comprises in the terms of weight percent: the recycled plastic greater than 30% and less than or equal to 40%, the heavy calcium carbonate greater than or equal to 60% and less than 70%. In one embodiment, the talc can be added to any of the formulation in an amount from 1% to 15%.

The technical effects achieved in the present invention through the above mentioned embodiments include improving the toughness, strength, surface smoothness, heat resistance, and electroplating performance of various products obtained, can be pressed through hydraulic press, results in the increased production, lowered labor, cost for producing various products and decreased pollution.

Further, the present invention provides a process of heat-pressing the composite which can improve production efficiency, the surface smoothness, the toughness of the product, the saving of the raw material, improving the heat resistance from −40° C. to −80° C. improve the electroplating performance of various products obtained, results in the decreased pollution. In order to achieve the subject of the present invention, there is provided a process for the heat-pressing of a recycled plastic composite comprising the steps of:

A. sufficiently mixing the pellet of the recycled plastic and the heavy calcium carbonate according to the formulations to get the composite;

B. the composite id fed to a screw melting machine with electric heating, heated and further mixed, the thick composite after being heated is conveyed to the outlet by the screw;

C. the thick composite is obtained at the outlet, conveyed to the steel mold of the hydraulic press according to the volume of the mold to be molded and pressed strongly;

D. said thick composite is cooled in the steel mold for 5 minute to 15 minute with the recirculation of the cooling water to de-mold the thick composite, and the thick composite is completely immersed in the water to be cooled completely to finish the heat-pressing of the composite.

Preferably, the size of the heavy calcium carbonate is from 600 mesh to 1200 mesh. Preferably, the temperature in the screw melting machine with electric heating is controlled to be from 160° C. to 240° C.

The technical effects achieved in the present invention through the above mentioned embodiments include improving production efficiency, the surface smoothness, the toughness of the product, the saving of the raw material, improving the heat resistance from −40° C. to −80° C., improving the electroplating performance of various products obtained, resulting in the decreased pollution. The product of the process of the present invention is the resin article such as flowerpot, frame for the image, lamp bracket and lamp socket fence of the garden, guard of the garden, gift, furniture decoration, construction decoration, graving, article, graving of emulation, and the raw materials for emulation animal and plant graving.

DESCRIPTION OF THE PREFERRED EMBODIMENTS

The present invention provides a formulation for a recycled plastic composite comprising in the terms of weight percent: a recycled EVA plastic from 30% to 80%, a heavy calcium carbonate from 20% to 70%.

Preferably, the recycled plastic is one or mixture of more in any ratio of a recycled EVA (ethylene-vinyl acetate copolymer), a recycled PP (chlorinated polypropylene), a recycled PVC (polyvinyl chloride), and a recycled PE (polyethylene). Specifically the formulation for the high toughness recycled plastic composite comprises in the terms of weight percent: the recycled plastic greater than 70% and less than or equal to 80%, heavy calcium carbonate greater than or equal to 20% and less then 30%.

Formulation 1: the recycled plastic 80%, the heavy calcium carbonate 20%.

Formulation 2: the recycled plastic 71%, the heavy calcium carbonate 29%.

Formulation 3: the recycled plastic 75%, the heavy calcium carbonate 25%.

More specifically the formulation for the less high toughness recycled plastic composite comprises in the terms of weight percent: the recycled plastic greater than 60% and less than or equal to 70%, the heavy calcium carbonate greater than or equal to 30% and less than 40%.

Formulation 4: the recycled EVA plastic 70%, the heavy calcium carbonate 30%.

Formulation 5: the recycled EVA plastic 65%, the heavy calcium carbonate 35%.

Formulation 6: the recycled EVA plastic 61%, the heavy calcium carbonate 39%.

Still more specifically the formulation for the medium toughness recycled plastic composite comprises in the terms of weight percent: the recycled plastic greater than 50% and less than or equal to 60%, the heavy calcium carbonate greater than or equal to 40% and less than 50%.

Formulation 7: the recycled EVA plastic 60%, the heavy calcium carbonate 40%.

Formulation 8: the recycled EVA plastic 55%, the heavy calcium carbonate 45%.

Formulation 9: the recycled EVA plastic 51%, the heavy calcium carbonate 49%.

Still more specifically the formulation for the less medium toughness recycled plastic composite comprises in the terms of weight percent: the recycled plastic greater than 40% and less than or equal to 50%, the heavy calcium carbonate greater than or equal to 50% and less than 60%.

Formulation 10: the recycled EVA plastic 50%, the heavy calcium carbonate 50%.

Formulation 11: the recycled EVA plastic 45%, the heavy calcium carbonate 55%.

Formulation 12: the recycled EVA plastic 39%, the heavy calcium carbonate 61%.

Still more specifically the formulation for the low toughness recycled plastic composite comprises in the terms of weight percent: the recycled plastic greater than 30% and less than or equal to 40%, the heavy calcium carbonate greater than or equal to 60% and less than 70%.

Formulation 13: the recycled EVA plastic 40%, the heavy calcium carbonate 60%.

Formulation 14: the recycled EVA plastic 35%, the heavy calcium carbonate 65%.

Formulation 15: the recycled EVA plastic 31%, the heavy calcium carbonate 69%.

Preferably, the talc can be added to any of the formulation in an amount from 1% to 15% in order to improve the surface smoothness of the article.

The method for producing the composite comprises sufficiently mixing the pellet of the recycled plastic and the heavy calcium carbonate according to any abovementioned formulations to get the composite, the composite is fed to a screw melting machine with electric heating, heated and further mixed, the thick composite after being heated is conveyed to the outlet by the screw; the thick composite is obtained at the outlet, conveyed to the steel mold of the hydraulic press according to the volume of the mold to be molded, the thick composite is completely immersed in the water after cooling the temperature thereof to complete the heat-pressing of the composite. The formulation of the present invention is useful in the resin article such as for the manufacturing of flowerpot, frame for the image, lamp bracket and lamp socket, fence of the garden, guard of the garden, unsaturated resin article, gift, furniture decoration, construction decoration, graving article, graving of emulation, and the raw materials for various products.

The present invention provides a process for the heat-pressing of a recycled plastic composite comprising the steps of:

A. sufficiently mixing the pellet of the recycled plastic and the heavy calcium carbonate according to the formulations to get the composite wherein the mixing can be carried out through a manual or mechanical means. The recycled plastic is one or mixture of more in any ratio of a recycled EVA (ethylene-vinyl acetate copolymer), a recycled PP (chlorinated polypropylene), a recycled PVC (polyvinyl chloride), and a recycled PE (polyethylene). The formulation is as follows:

The formulation for the high toughness recycled plastic composite: the recycled plastic from 70% to 80%, the heavy calcium carbonate from 20% to 30%; the formulation for the less high toughness recycled plastic: the recycled plastic from 60% to 70%, the heavy calcium carbonate from 30% to 40%; the formulation for the medium toughness recycled plastic: the recycled plastic from 50% to 60%, the heavy calcium carbonate from 40% to 50%; the formulation for the less medium toughness recycled plastic: the recycled plastic from 40% to 50%, the heavy calcium carbonate from 50% to 60%; the formulation for the low toughness recycled plastic: the recycled plastic from 30% to 40%, the heavy calcium carbonate from 60% to 70%.

B. the composite is fed to a screw melting machine with electric heating, heated and further mixed, the thick composite after being heated is conveyed to the outlet by the screw; in the step B, the feeding of the composite to the screw melting machine with electric heating can be carried out through a manual or mechanical means;

C. the thick composite is obtained at the outlet, conveyed to the steel mold of the hydraulic press according to the volume of the mold to be molded and pressed strongly; in the step C, the obtaining of the thick composite can be carried out through a manual or mechanical means; or the conveying of the thick composite to the steel mold of the hydraulic press can be carried out through a manual or mechanical means;

D. said thick composite is cooled in the steel mold for 5 minute to 15 minute with the recirculation of the cooling water to de-mold the thick composite, and the thick composite is completely immersed in the water to be cooled completely to finish the heat-passing of the composite.

Preferably in the example described above, the size of the heavy calcium carbonate is from 600 mesh to 1200 mesh. Preferably in the example described above, the temperature in the screw melting machine with electric heating is controlled to be from 160° C. to 240° C.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only an not limiting as to the scope of invention which is to be give the full breadth of the claims appended and any and all equivalents thereof.

What is claimed is:

1. A recycled plastic composite composition comprising, based on a total composition:
   30 to 80 wt. % of recycled plastic;
   20 to 70 wt. % heavy calcium carbonate powder; and
   1 to 15 wt. % talc;
   wherein the recycled plastic comprises ethylene-vinyl acetate copolymer, chlorinated polypropylene, polyvinyl chloride, polyethylene, or a combination thereof.

2. The composition of claim 1, wherein the recycled plastic comprises ethylene-vinyl acetate copolymer.

3. The composition of claim 1, wherein the recycled plastic consists of ethylene-vinyl acetate copolymer.

4. The composition of claim 1, wherein the recycled plastic is present in an amount greater than 70 wt. % and less than or equal to 80 wt. %; and
   heavy calcium carbonate is present in an amount greater than 20 wt. % and less than or equal to 30 wt. %.

5. The composition of claim 1, wherein the recycled plastic is present in an amount greater than 60 wt. % and less than or equal to 70 wt. %; and
   heavy calcium carbonate is present in an amount greater than 30 wt. % and less than or equal to 40 wt. %.

6. The composition of claim 1, wherein the recycled plastic is present in an amount greater than 50 wt. % and less than or equal to 60 wt. %; and
   heavy calcium carbonate is present in an amount greater than 40 wt. % and less than or equal to 50 wt. %.

7. The composition of claim 1, wherein the recycled plastic is present in an amount greater than 40 wt. % and less than or equal to 50 wt. %; and
   heavy calcium carbonate is present in an amount greater than 50 wt. % and less than or equal to 60 wt. %.

8. The composition of claim 1, wherein a size of heavy calcium carbonate is from 600 mesh to 1200 mesh.

\* \* \* \* \*